United States Patent
Matsumoto

(10) Patent No.: US 6,704,552 B1
(45) Date of Patent: Mar. 9, 2004

(54) MOBILE COMMUNICATION APPARATUS WITH AN AUTOMATIC FREQUENCY CONTROLLER

(75) Inventor: Mariko Matsumoto, Tokyo (JP)

(73) Assignee: NEC Corporation, Tokyo (JP)

(*) Notice: Subject to any disclaimer, the term of this patent is extended or adjusted under 35 U.S.C. 154(b) by 449 days.

(21) Appl. No.: 09/656,711

(22) Filed: Sep. 7, 2000

(30) Foreign Application Priority Data

Sep. 9, 1999 (JP) .......................................... 11-255753

(51) Int. Cl.[7] ................................................. H09B 1/18
(52) U.S. Cl. ............................... 455/164.1; 455/164.2; 455/165.1; 455/192.1; 375/147; 375/148
(58) Field of Search ........................... 455/164.1, 164.2, 455/165.1, 192.1, 190.1, 306, 550, 313, 182.2; 375/130, 136, 146, 208, 200, 210, 137, 145

(56) References Cited

U.S. PATENT DOCUMENTS

| 5,812,593 A | * | 9/1998 | Kaku ........................... 375/150 |
| 6,026,115 A | * | 2/2000 | Higashi et al. .............. 375/148 |
| 6,067,292 A | * | 5/2000 | Huang et al. ................ 370/342 |
| 6,085,104 A | * | 7/2000 | Kowalski et al. ........... 455/506 |
| 6,178,193 B1 | * | 1/2001 | Kondo ......................... 375/130 |
| 6,421,373 B1 | * | 7/2002 | Saito ............................ 375/148 |

FOREIGN PATENT DOCUMENTS

| JP | 6-125329 A | 5/1994 |
| JP | 6-209304 A | 7/1994 |
| JP | 10-126331 A | 5/1998 |
| JP | 2000-209128 A | 7/2000 |

* cited by examiner

Primary Examiner—Cong Van Than
(74) Attorney, Agent, or Firm—Sughrue Mion, PLLC

(57) ABSTRACT

A plurality of finger units despread a received signal with a first spread code to output pilot signals of a receiving channel which has been spread with the first spread code. An AFC unit despreads the received signal with a second spread code to output a pilot signal of an AFC channel which has been spread with the second spread code. An automatic frequency controller calculates a difference between an oscillating frequency of a oscillator and a frequency of the received signal for the channels based on the pilot signals of the receiving and AFC channels to supply a frequency control signal to the oscillator, whereby the oscillating frequency of the oscillator is controlled so that the oscillating frequency is substantially equal to the frequency of the received signal.

30 Claims, 3 Drawing Sheets

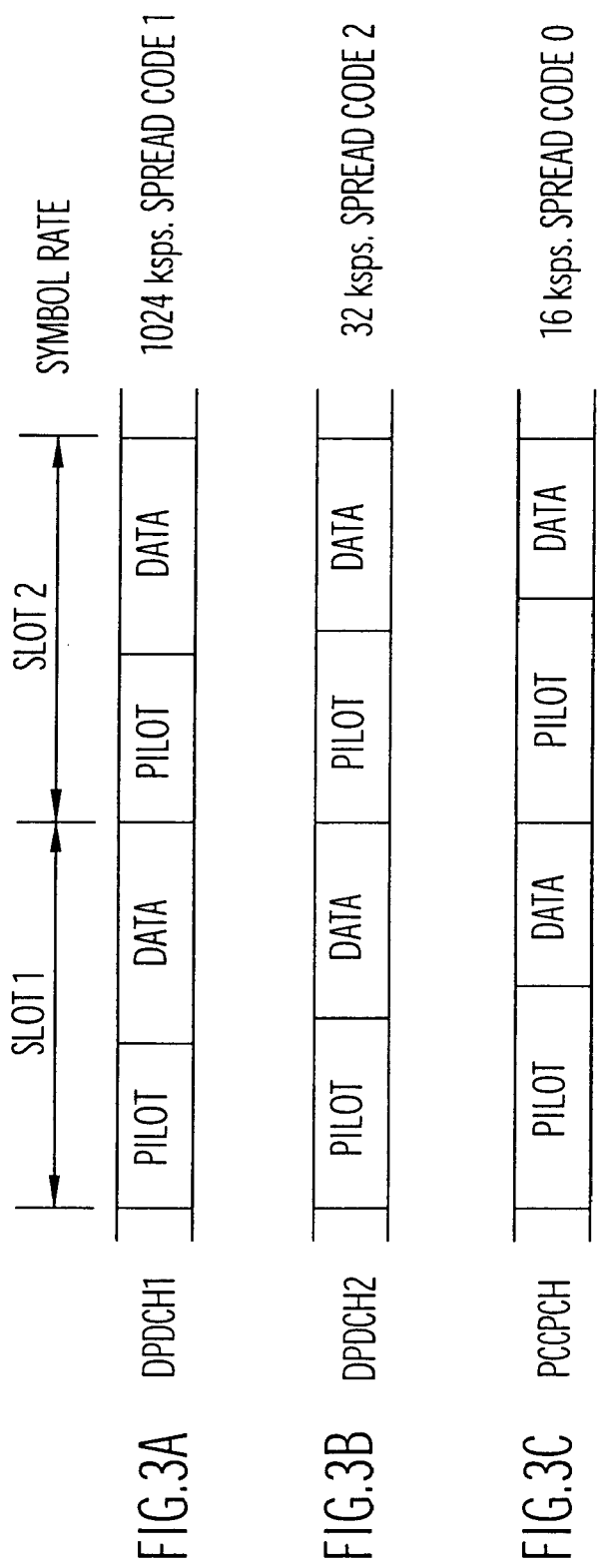

MOBILE COMMUNICATION APPARATUS WITH AN AUTOMATIC FREQUENCY CONTROLLER

BACKGROUND OF THE INVENTION

1. Field of the Invention

The present invention relates to a mobile communication apparatus. In particular it relates to a mobile communication apparatus with an automatic frequency controller suitable to apply to a code division multiple access (CDMA) communication system.

2. Description of the Related Art

Spread spectrum communication systems such as code division multiple access (CDMA) communication systems are now attracting a great deal of attention for use in mobile communications because they obtain favorable receiving properties in communications susceptible to multi-path interference, since those systems have high resistance to both interference and disturbance. In a conventional spread spectrum communication system, it is strictly required that a reference clock frequency, i.e., an operation frequency, of both transmitter and receiver coincide with one another. However, an oscillator that satisfies such a high accuracy demand is expensive, and thus, has been considered unsuitable for use in mobile communication terminals because they must be sold at a relatively lower price. Therefore, a conventional CDMA mobile communication terminal generally performs automatic frequency control (AFC) that automatically matches an operation frequency of a receiver with a frequency of a received signal.

A conventional CDMA receiver calculates a difference between a frequency of a received signal and an operation frequency of a receiver using only a receiving channel for receiving information data and controlling the operation frequency so as to compensate for the difference.

In FIG. 1, the conventional CDMA receiver comprises a radio communication unit 10 which obtains analog I and Q signals from a received signal received by an antenna (not shown), an A/D converter 21 which converts analog I and Q signals to digital I and Q signals, a signal processor 20 which processes the digital I and Q signals to output a digital frequency control signal for controlling an operation frequency of the CDMA receiver, a D/A converter 28 which converts the digital frequency control signal to an analog frequency control signal, and a low-path filter 29 which shapes a waveform of the analog frequency control signal and supplies the resulting signal to the radio communication unit 10.

In the radio communication unit 10, an amplifier 11 amplifies the received signal from an antenna (not shown). A voltage control oscillator 12 enables its oscillating frequency to be controlled according to a voltage of the analog frequency control signal from the low-pass filter 29. A phase shifter 13 shifts an output signal from the voltage control oscillator 12 by $\pi/2$. A multiplier 14 multiplies the amplified received signal from the amplifier 11 by the output signal from the voltage control oscillator 12. A multiplier 15 multiplies the amplified received signal from the amplifier 11 by an output signal from the phase shifter 13. Low-path filters 16 and 17 shape waveforms of output signals from the multipliers 14 and 15 to output analog I and Q signals, respectively.

The A/D converter 21 converts the analog I and Q signals from the radio communication unit 10 to digital I and Q signals.

In the signal processor 20, each of finger units $22_1$ to $22_n$ despreads the digital I and Q signals from the A/D converter 21 with a predetermined spread code and outputs a despread signal. In addition, each of the finger units $22_1$ to $22_n$ extracts a pilot signal from the despread signal and converts all the symbols in the pilot signal to those in the same quadrant, then outputs the converted signal. A rake receiver 23 synthesizes the despread signals in the same phase and outputs the synthesized signal. A delay profile calculator 24 calculates an arrival phase of the received signal by each of a plurality of estimated multi-path delays and a reception level in each arrival phase based on the digital I and Q signals from the A/D converter 21 and outputs the results as a delay profile of an object receiving channel. A path controller 25 determines a despread timing when each of the finger units $202_1$ to $202_n$ despreads the digital I and Q signals according to the delay profile supplied from the delay profile calculator 24 and supplies an instruction signal indicative of the despread timing to each of the finger units $22_1$ to $22_n$.

An automatic frequency control (AFC) unit 26 calculates a difference between a frequency of a received signal and an oscillating frequency of the voltage control oscillator 12 so as to output a frequency difference signal as a digital frequency control signal. The calculation is based on signals output from the finger units $22_1$ to $21_n$, wherein all the symbols in the pilot signal are converted to those in the same quadrant at this time. A channel assignment controller 27 notifies the delay profile calculator 24 and the finger units $22_1$ to $22_n$ of a receiving channel. The D/A converter 28 converts the digital frequency control signal output from the AFC unit 26 to an analog frequency control signal. The low-path filter 29 shapes the waveform of the analog frequency control signal output from the D/A converter 28 to supply the shaped analog frequency control signal to the voltage control oscillator 12.

Next, an operation of the conventional CDMA receiver will be discussed with reference to FIG. 1.

The radio communication unit 10 samples both I and Q signals from a received signal received at an antenna (not shown) and supplies those sampled I and Q signals to the signal processor 20 via the A/D converter 21.

On the other hand, the channel assignment controller 27 notifies the delay profile calculator 24 and the finger units $22_1$ to $22_2$ of information indicative of the receiving channel for the CDMA receiver, e.g., a predetermined spread code for despreading against the received signal of the receiving channel.

Notified of the information indicative of the receiving channel, the delay profile calculator 24 calculates a correlated power value between the received signal from the radio communication unit 10 and a known transmission replica, and outputs the result as a delay profile of the receiving channel. The delay profile denotes an arrival phase of the received signal by each of the estimated multi-path delays and a receiving level for each arrival phase. The path controller 25 selects one of despread timings in a favorable receiving state from the delay profile of the receiving channel and directs the despread timing to the finger units $22_1$ to $22_n$ respectively. Each of the finger units $22_1$ to $22_n$ despreads and demodulates the received signal of the receiving channel notified from the channel assignment controller 27 at the despread timing directed from the path controller 25, then extracts the pilot signal from the despread and demodulated signal and converts all the symbols in the pilot signal to those in the same quadrant, then outputs the converted signal to the AFC unit 26.

The AFC unit 26 multiplies a conjugate complex number of a symbol by a complex number of the next symbol so as to calculate a phase difference per symbol time, then divides the result by a symbol time. This results in calculating a frequency difference corresponding to each finger unit, wherein the symbols are received from the finger units $22_1$ to $22_2$ and converted to those in the same quadrant. The AFC unit 26 then synthesizes the frequency differences and outputs the synthesized value to the D/A converter 28 as the digital frequency control signal. The output signal from the AFC unit 26 is converted from digital to analog in the D/A converter 28 and the waveform thereof is shaped in the low-path filter 29. The shaped signal from the low-pass filter 29 is used for controlling the oscillating frequency of the voltage control oscillator 12. Consequently, the oscillation frequency of the voltage control oscillator 12 is controlled so as to match with the frequency of the received signal.

Since the conventional CDMA receiver controls its operation frequency with use of only the pilot signal of a receiving channel assigned thereto, the number of symbols in the pilot signal used for calculating the frequency difference is insufficient, thereby it takes much time to match the operation frequency with the frequency of the received signal.

Furthermore, if a symbol rate of the receiving channel is too high, both symbol time and a phase difference calculated in the AFC unit 26 take small values. The conventional CDMA receiver is confronted with another problem that the calculation accuracy of the frequency difference is degraded. In a battery saving operation wherein a battery of the receiver is automatically turned off so as to reduce power consumption, since the frequency difference becomes too large when the CDMA receiver is turned on, the battery must be kept turned on for a long time so as to wait for a pilot signal for improving the calculation accuracy of the frequency difference. This causes the effect of the battery saving operation to be reduced.

SUMMARY OF THE INVENTION

It is therefore an object of the present invention to provide a mobile communication apparatus suitable to apply to a CDMA communication system.

Another object of the present invention is to provide a mobile communication apparatus capable of controlling an operation frequency thereof accurately and quickly.

In order to achieve the above objects, a mobile communication apparatus according to an embodiment of the present invention comprises a first signal processor that despreads a received signal with a first spread code to obtain a first pilot signal of a first channel, a second signal processor that despreads the received signal with a second spread code to obtain a second pilot signal of a second channel, and a controller coupled to said first and second signal processors, that controls an operation frequency of the mobile communication apparatus based on the first and second pilot signals.

In order to further achieve the above objects, a communication apparatus according to an embodiment of the present invention comprises a first despreader that despreads a received signal with a first spread code to obtain a first pilot signal of a first channel, wherein the first channel has been spread with the first spread code, a second despreader that despreads the received signal with a second spread code to obtain a second pilot signal of a second channel, wherein the second channel has been spread with the second spread code, and a controller that calculates a difference between an operation frequency of the CDMA communication apparatus and a frequency of the received signal based on the pilot signals of both the first and second channels to control the operation frequency.

In order to still further achieve the above objects, a receiver according to an embodiment of the present invention comprises a radio communication unit having an oscillator, that receives a signal and outputs a received signal, a plurality of first despreaders that despread the received signal with a first spread code to output first pilot signals of a first channel which has been spread with the first spread code, a second despreader that despreads the received signal with a second spread code to output a second pilot signal of a second channel which has been spread with the second spread code, and an automatic frequency controller that calculates a difference between an oscillating frequency of the oscillator and a frequency of the received signal for each of the first and second channels based on the first pilot signals and the second pilot signal to supply a frequency control signal to the oscillator, whereby the oscillating frequency of the oscillator is controlled so that the oscillating frequency is substantially equal to the frequency of the received signal.

In order to achieve the above objects, a method of controlling an operation frequency of a receiver, according to an embodiment of the present invention comprises despreading a received signal with a first spread code to obtain a first pilot signal of a first channel which has been spread with the first spread code, despreading a received signal with a second spread code to obtain a second pilot signal of a second channel which has been spread with the second spread code, calculating a difference between an operation frequency of the receiver and a frequency of the received signal based on the first and second pilot signals, and controlling the operation frequency based on the difference.

BRIEF DESCRIPTION OF THE DRAWINGS

These and other objects, features and advantages of this invention will become more fully apparent from the following detailed description taken with the accompanying drawings in which:

FIGS. 3A to 3C are diagrams showing frame structures of channels, respectively, which are used for controlling an operation frequency of the receiver according to an embodiment of the present invention.

DETAILED DESCRIPTION OF THE PREFERRED EMBODIMENTS

Figure 1:
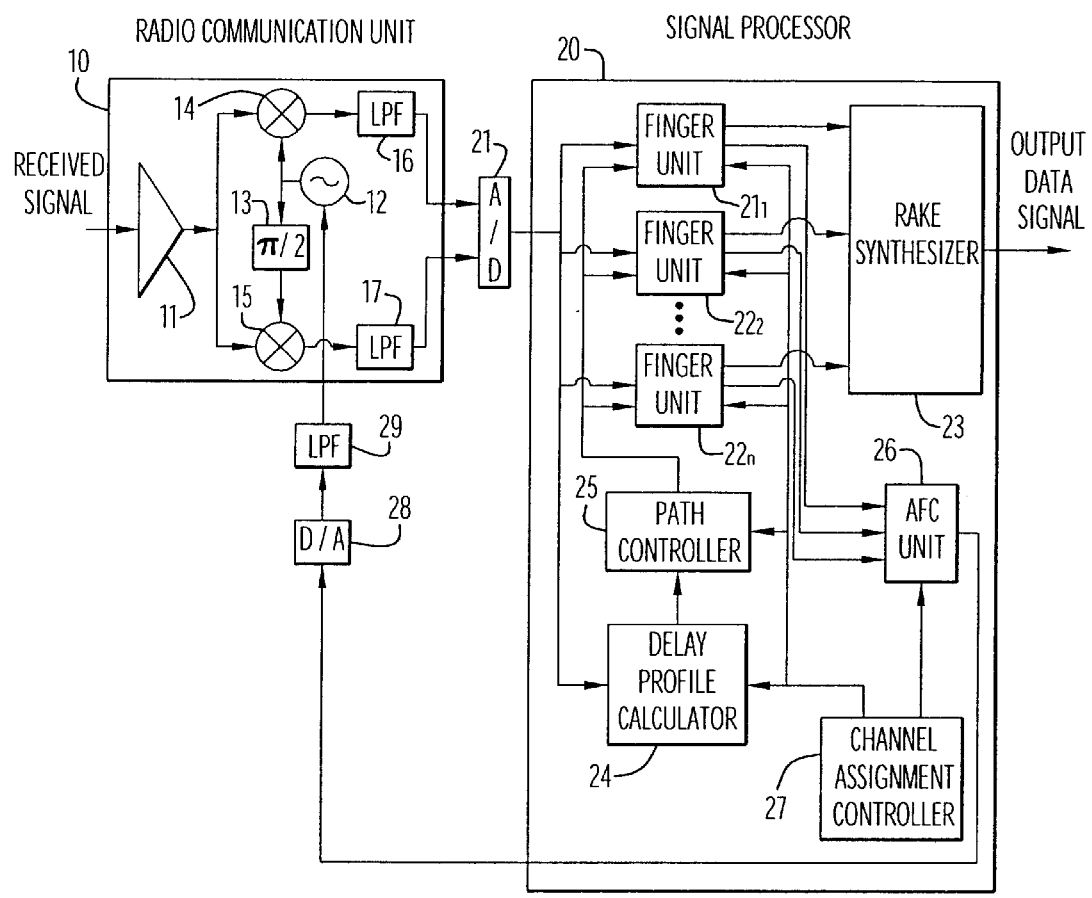
FIG. 1 is a block diagram showing a conventional CDMA receiver.

The preferred embodiments of the present invention will be discussed by referring to the drawings.

Figure 2:
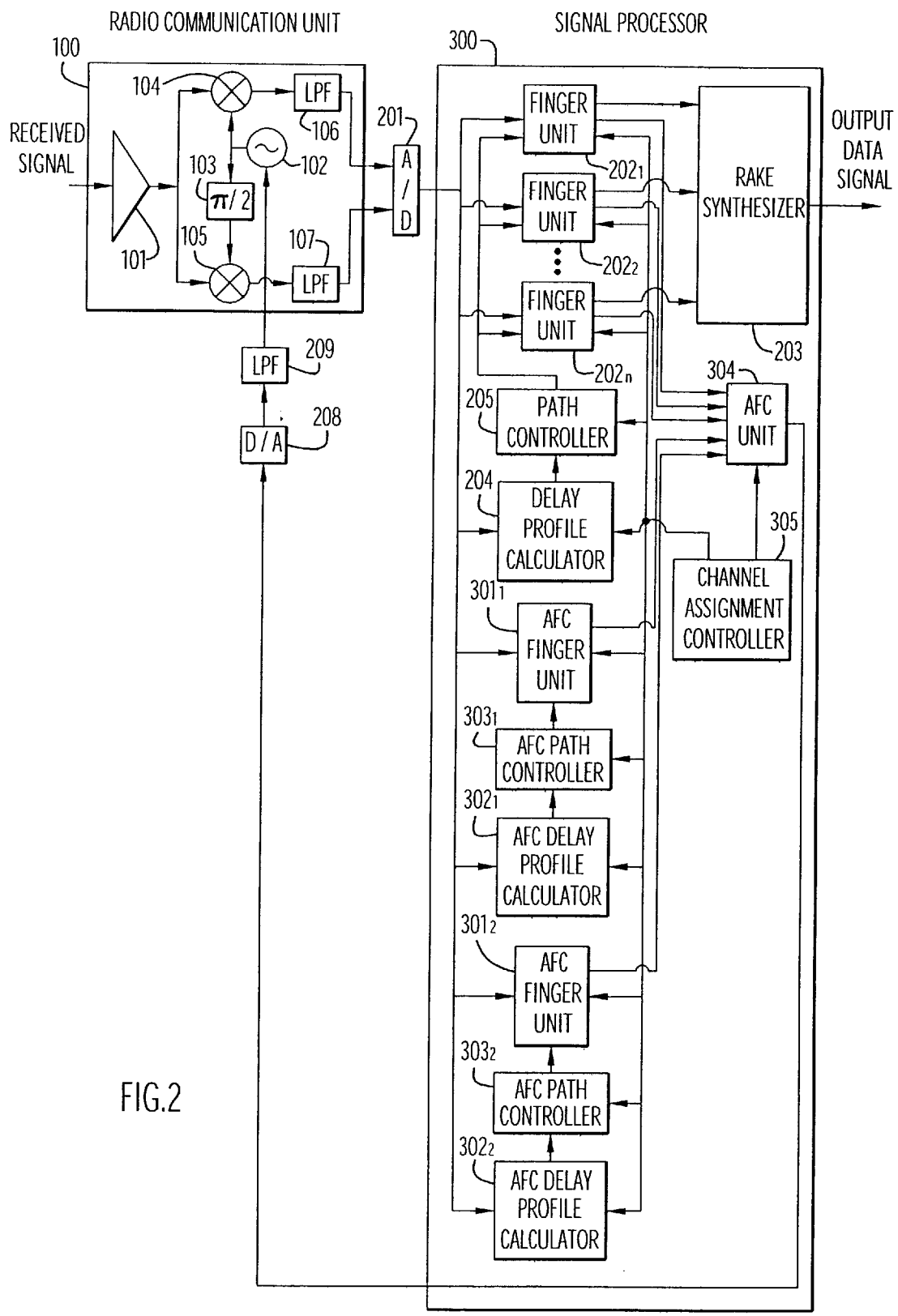
FIG. 2 is a block diagram showing a receiver according to an embodiment of the present invention.

Referring to FIG. 2, a receiver according to an embodiment of the present invention comprises a radio communication unit 100 which obtains analog I and Q signals from a received signal received by an antenna (not shown), an A/D converter 201 which converts the analog I and Q signals to digital I and Q signals, a signal processor 300 which executes processing the digital I and Q signals to output a digital frequency control signal for controlling an operation frequency of the receiver, a D/A converter 208 which converts the digital frequency control signal output from the signal processor 300 to an analog frequency control signal, and a low-pass filter (LPF) 209 which shapes a waveform of the analog frequency control signal and supplies the result signal to the radio communication unit 100.

In the radio communication unit 100, an amplifier 101 amplifies the received signal from an antenna (not shown). A voltage control oscillator 102 enables its oscillating frequency to be controlled according to a voltage of the analog frequency control signal from the low-pass filter 209. A phase shifter 103 shifts an output signal from the voltage control oscillator 102 by $\pi/2$. A multiplier 104 multiplies the amplified received signal from the amplifier 101 by the output signal from the voltage control oscillator 102. A multiplier 105 multiplies the amplified received signal from the amplifier 101 by an output signal from the phase shifter 103. Low-path filters 106 and 107 shape waveforms of output signals from the multipliers 104 and 105 to output analog I and Q signals, respectively.

The A/D converter 201 converts the analog I and Q signals from the radio communication unit 100 to digital I and Q signals.

In the signal processor 200, each of finger units $202_1$ to $202_n$ despreads the digital I and Q signals from the A/D converter 201 with a predetermined spread code and outputs a despread signal. In addition, each of the finger units $202_1$ to $202_n$ extracts a pilot signal from the despread signal and converts all the symbols in the pilot signal to those in the same quadrant, then outputs the converted signal. A rake receiver 203 synthesizes the despread signals in the same phase and outputs the synthesized signal. A delay profile calculator 204 calculates an arrival phase of the received signal by each of the estimated multi-path delays and a reception level in each arrival phase based on the digital I and Q signals from the A/D converter 201 and outputs the results as a delay profile of an object receiving channel. A path controller 205 determines a despread timing when each of the finger units $202_1$ to $202_n$ executes a despread against the digital I and Q signals according to the delay profile supplied from the delay profile calculator 204 and supplies an instruction signal indicative of the despread timing to each of the finger units $202_1$ to $202_n$.

Each of AFC finger units $301_1$ and $301_2$ despreads the digital I and Q signals output from the A/D converter 201 with use of a predetermined spread code at a predetermined timing, then extracts a pilot signal from the despread and demodulated signal so as to convert all the symbols in the pilot signal to those in the same quadrant, and then outputs the converted pilot signal. Each of the AFC delay profile calculators $302_1$ and $302_2$ calculates both an estimated arrival phase of an AFC channel by at least one of the multi-path delays and a reception level in each arrival phase based on the digital I and Q signals output from the A/D converter 201 and outputs the result as a delay profile of the AFC channel. Each of AFC path controllers $303_1$ and $303_2$ determines a despread timing according to the delay profile of the AFC channel and supplies a timing signal indicative of the despread timing to the AFC fingers $301_1$ and $301_2$. The despread timing indicates a timing when the AFC finger units $301_1$ and $301_2$ execute a despread process, respectively.

An automatic frequency control (AFC) unit 304 outputs a difference signal indicative of an estimated value of the difference between a frequency of a received signal and an oscillating frequency of the voltage control oscillator 102. The difference signal is based on signals obtained by converting all the symbols in the pilot signal to those in the same quadrant, which are output from the finger units $202_1$ to $202_n$ and the AFC finger units $301_1$ and $301_2$. The difference signal is supplied to the D/A converter 208 as the digital frequency control signal.

A channel assignment controller 305 notifies the delay profile calculator 204 and the finger units $202_1$ to $202_n$ of information indicative of the receiving channel, e.g., a predetermined spread code for despreading the received signal of the receiving channel, and notifies the AFC delay profile calculators $302_1$ and $302_2$ and the AFC finger units $301_1$ and $301_2$ of information indicative of the AFC channel, e.g., a predetermined spread code for despreading the received signal of the AFC channel, respectively.

Spread codes for the receiving channel and the AFC channel are different from each other. Also, symbol rates for them are different from each other.

The D/A converter 208 converts the digital frequency control signal output from the AFC unit 304 to the analog frequency control signal.

The low-path filter 209 shapes the waveform of the analog frequency control signal from the D/A converter 208 and outputs the resulting signal to the voltage control oscillator 102 to control the oscillating frequency thereof.

Next, the operation of the receiver according to an embodiment of the present invention is discussed with reference to FIGS. 2, 3A, 3B and 3C. In this embodiment, a dedicated physical data channel (DPDCH) 1 is assigned as a receiving channel which is used for receiving data information which is transmitted to the receiver, as shown in FIG. 3A. Also, a DPDCH 2 and a primary common control physical channel (PCCPCH) are assigned as AFC channels, as shown in FIGS. 3B and 3C. The number of the AFC channels is not limited to this embodiment and it may be one or more than one.

The DPDCH 1 has been spread with a spread code 1 and has a symbol rate of 1024 kilo symbols per second (ksps). The DPDCH 2 has been spread with a spread code 2 and has a symbol rate of 32 ksps. Also, the PCCPCH has been spread with a spread code 0 and has a symbol rate of 16 ksps.

The channel assignment controller 305 assigns the DPDCH 1 to the finger units $202_1$ to $202_n$, since the DPDCH 1 is a receiving channel. The delay profile calculator 204 calculates a correlated power value between a received signal and a transmission replica so as to calculate a delay profile of the DPDCH 1. The path controller 205 notifies the finger units $202_1$ to $202_n$ of timing information indicative of a first despread timing based on the delay profile of the DPDCH 1. Each of the finger units $202_1$ to $202_n$ despreads the received signal at the first despread timing and outputs the result to the rake receiver 203. Each of the finger units $202_1$ to $202_n$ extracts a pilot signal from the despread signal so as to convert all the symbols in the pilot signal to those in the same quadrant. Each of the finger units $202_1$ to $202_n$ then outputs the converted signal to the AFC unit 304.

The channel assignment controller 305 assigns the DPDCH 2 to the AFC finger unit $301_1$, the AFC delay profile calculator $302_1$, and the AFC path controller $303_1$, since the DPDCH 2 is an AFC channel. The AFC delay profile calculator $302_1$ calculates a correlated power value between the received signal and a known transmission replica so as to calculate a delay profile of the DPDCH 2. The AFC path controller $303_1$, notifies the AFC finger unit $301_1$ of timing information indicative of a second despread timing based on a delay profile of the DPDCH 2. The AFC finger unit $301_1$ despreads the received signal at the second despread timing and extracts a pilot signal from the despread signal so as to convert all the symbols in the pilot signal to those in the same quadrant. The AFC finger unit $301_1$ then outputs the converted signal to the AFC unit 304.

Because the PCCPCH is also an AFC channel, the channel assignment controller 305 assigns the PCCPCH to the AFC finger unit $301_2$, the AFC delay profile calculator $302_1$ and the AFC path controller $303_2$. The AFC delay profile calculator $302_2$ calculates a correlated value between the received signal and a known transmission replica so as to calculate a delay profile of the PCCPCH. The AFC path controller $303_2$ notifies the AFC finger unit $301_2$ of timing information indicative of a third despread timing based on the delay profile of the PCCPCH. The AFC finger unit $301_2$ despreads the received signal at the third despread timing and extracts a pilot signal from the despread signal so as to convert all the symbols in the pilot signal to those in the same quadrant. The AFC finger unit $301_2$ then outputs the converted signal to the AFC unit 304.

The AFC unit 304 multiplies a conjugate complex number of an entered symbol by a complex number of the next entered symbol for each of the converted signals supplied from the finger units $202_1$ to $202_n$ and the AFC finger units $301_1$ and $301_2$ so as to calculate a phase difference per symbol time. The AFC unit 304 then divides the phase difference by a symbol time, thereby calculating an estimated value of the frequency difference obtained from each of the finger units $202_1$ to $202_n$ and the AFC finger units $301_1$ and $301_2$ so as to control the voltage control oscillator 102 with a digital frequency control signal obtained by synthesizing those estimated values.

In this embodiment, a receiving channel is used as one of a plurality of channels for controlling an operation frequency. However, the receiving channel does not need to be used for such automatic frequency control.

For example, in this embodiment, only the DPDCH 2 and PCCPCH may be used for calculating a frequency control signal.

Furthermore, this embodiment of the present invention may also be used for communications without taking into account multi-path delays. In such a case, the finger units $202_2$ to $202_n$, the rake receiver 203, the delay profile calculator 204, the path controller 205, the AFC delay profile calculators $302_1$ and $302_2$, and the AFC path controllers $303_1$ and $303_2$ all can be omitted because no rake receiving operation is needed. The finger unit $202_1$ and the AFC finger units $301_1$ and $301_2$ just perform despreading at a predetermined timing, respectively.

In this embodiment, because the pilot signals of both the receiving channel and the AFC channel are used to calculate a frequency difference, many frequency difference values can be estimated quickly, thereby quickly rendering a controllable operation frequency equal to a frequency of the received signal.

In addition, even when a symbol rate of the receiving channel is too high, since it is possible to assign another channel with a low symbol rate, e.g. a control channel, a receiving channel for another user, etc., as an AFC channel, an operation frequency can be controlled very accurately and quickly based on a pilot signal of another channel with a low symbol rate.

Consequently, even when an oscillator is selected with an accuracy that is slightly low, negative factors caused by using such an oscillator are compensated with the fast and accurate frequency control according to the present invention. Therefore, the cost of the receiver can be reduced with use of such a less expensive oscillator. Even in a battery saving operation, battery ON time can be reduced, thereby lowering power consumption of the receiver.

Furthermore, the above described frequency control may be done with use of pilot signals of a plurality of channels only when a symbol rate of the receiving channel is too high. In this case, a pilot signal of an AFC channel is used for controlling an operation frequency only if a symbol rate of the receiving channel is higher than a predetermined level.

The invention may be embodied in other specific forms without departing from the spirit or essential characteristics thereof. The embodiments of the present invention described here are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A mobile communication apparatus, comprising:
    a first signal processor that despreads a received signal with a first spread code to obtain a first pilot signal of a first channel;
    a second signal processor that despreads the received signal with a second spread code to obtain a second pilot signal of a second channel; and
    a controller coupled to said first and second signal processors, that controls an operation frequency of the mobile communication apparatus based on the first and second pilot signals, wherein the first and second spread codes are different codes and the first and second pilot signals are different pilot signals.

2. The mobile communication apparatus as claimed in claim 1, wherein the first channel has been spread with the first spread code.

3. The mobile communication system as claimed in claim 1, wherein the second channel has been spread with the second spread code which is different from the first spread code.

4. The mobile communication system as claimed in claim 1, further comprising a third signal processor that despreads the received signal with a third spread code to obtain a third pilot signal of a third channel, wherein the third spread code is different from both of the first and second spread codes, and
    wherein said controller controls the operation frequency of the mobile communication apparatus based on the first, second and third pilot signals.

5. The mobile communication system as claimed in claim 1, wherein a symbol rate of the first channel is different from a symbol rate of the second channel.

6. The mobile communication apparatus as claimed in claim 5, wherein the symbol rate of the first channel is greater than the symbol rate of the second channel, and wherein the first channel is used for transmitting information to the mobile communication apparatus.

7. The mobile communication apparatus as claimed in claim 1, wherein said first signal processor comprises:
    a first delay profile calculator that calculates a first delay profile of the first channel based on the received signal; and
    a first path controller that controls a despread timing of said first signal processor based on the first delay profile of the first channel.

8. The mobile communication apparatus as claimed in claim 7, wherein the first delay profile indicates an arrival phase of the received signal by each of a plurality of estimated multi-path delays and a reception level for each arrival phase.

9. The mobile communication apparatus as claimed in claim 7, wherein said second signal processor comprises:
- a second delay profile calculator that calculates a second delay profile of the second channel based on the received signal; and
- a second path controller that controls a despread timing of said second signal processor based on the second delay profile of the second channel.

10. The mobile communication apparatus as claimed in claim 9, wherein the second delay profile indicates an estimated arrival phase for the second channel by at least one of a plurality of multi-path delays and a reception level for each arrival phase.

11. The mobile communication apparatus as claimed in claim 1, wherein the first channel is used for receiving information which is transmitted to the mobile communication apparatus, and the second channel is used for an automatic frequency control.

12. The mobile communication apparatus as claimed in claim 1, wherein said controller uses the second pilot signal when a symbol rate of the first channel is higher than a predetermined level.

13. A communication apparatus, comprising:
- a first despreader that despreads a received signal with a first spread code to obtain a first pilot signal of a first channel, wherein the first channel has been spread with the first spread code;
- a second despreader that despreads the received signal with a second spread code to obtain a second pilot signal of a second channel, wherein the second channel has been spread with the second spread code; and
- a controller that calculates a difference between an operation frequency of the communication apparatus and a frequency of the received signal based on the pilot signals of both the first and second channels to control the operation frequency, wherein the first and second spread codes are different codes and the first and second pilot signals are different pilot signals.

14. The communication apparatus as claimed in claim 13, further comprising a third despreader that despreads the received signal with a third spread code to obtain a third pilot signal of a third channel, wherein the third channel has been spread with the third spread code and the third spread code is different from the first and second spread codes, and
wherein said controller calculates the difference between the operation frequency of the communication apparatus and the frequency of the received signal based on the pilot signals of the first, second and third channels to control the operation frequency.

15. The communication apparatus as claimed in claim 13, wherein the first channel is used for receiving information which is transmitted to the communication apparatus, and the second channel is a control channel.

16. The communication apparatus as claimed in claim 15, wherein a symbol rate of the first channel is higher than a symbol rate of the second channel.

17. The communication apparatus as claimed in claim 13, wherein said controller calculates the difference between the operation frequency of the communication apparatus and the frequency of the received signal for each of the first and second channels and synthesizes each difference of the first and second channels to output an frequency control signal.

18. The communication apparatus as claimed in claim 13, further comprising:
- a first delay profile calculator that calculates a first delay profile of the first channel based on the received signal; and
- a first path controller that controls a despread timing of said first despreader based on the first delay profile of the first channel.

19. The communication apparatus as claimed in claim 18, wherein the first delay profile indicates an arrival phase of the received signal by each of a plurality of estimated multi-path delays and a reception level for each arrival phase.

20. The communication apparatus as claimed in claim 13, further comprising:
- a second delay profile calculator that calculates a second delay profile of the second channel based on the received signal;
- a second path controller that controls a despread timing of said second despreader based on the second delay profile of the second channel.

21. The communication apparatus as claimed in claim 20, wherein the second delay profile indicates an estimated arrival phase for the second channel by at least one of a plurality of multi-path delays and a reception level for each arrival phase.

22. The communication apparatus as claimed in claim 13, wherein the communication apparatus is a code division multiple access communication apparatus.

23. A receiver, comprising:
- a radio communication unit having an oscillator, that receives a signal and outputs a received signal;
- a plurality of first despreaders that despread the received signal with a first spread code to output first pilot signals of a first channel which has been spread with the first spread code;
- a second despreader that despreads the received signal with a second spread code to output a second pilot signal of a second channel which has been spread with the second spread code; and
- an automatic frequency controller that calculates a difference between an oscillating frequency of the oscillator and a frequency of the received signal for each of the first and second channels based on the first pilot signals and the second pilot signal to supply a frequency control signal to the oscillator, whereby the oscillating frequency of the oscillator is controlled so that the oscillating frequency is substantially equal to the frequency of the received signal.

24. The receiver as claimed in claim 23, further comprising:
- a rake receiver that synthesizes despread signals from a plurality of said first despreaders.

25. The receiver as claimed in claim 23, further comprising:
- a delay profile calculator that calculates a delay profile of the first channel based on the received signal; and
- a path controller that controls despread timings of a plurality of said first despreaders based on the delay profile of the first channel, thereby a plurality of said first despreaders despread the received signal at different timings from each other.

26. The communication apparatus as claimed in claim 23, wherein the communication receiver is a code division multiple access communication receiver.

27. A method of controlling an operation frequency of a receiver, the method comprising:
- despreading a received signal with a first spread code to obtain a first pilot signal of a first channel which has been spread with the first spread code;

despreading a received signal with a second spread code to obtain a second pilot signal of a second channel which has been spread with the second spread code;

calculating a difference between an operation frequency of the receiver and a frequency of the received signal based on the first and second pilot signals; and controlling the operation frequency based on the difference, wherein the first and second spread codes are different codes and the first and second pilot signals are different pilot signals.

28. The method as claimed in claim 27, further comprising:

calculating a delay profile indicative of an arrival phase of the received signal by each of a plurality of estimated multi-path delays and a reception level for each arrival phase, based on the received signal; and controlling a despread timing in relation to the received signal.

29. The method as claimed in claim 27, wherein the first channel is used for receiving information which is transmitted to the receiver, and the second channel is a control channel.

30. The method as claimed in claim 29, wherein a symbol rate of the first channel is higher than a symbol rate of the second channel.

* * * * *